(12) United States Patent
Jorke (10) Patent No.: US 7,001,021 B2
(45) Date of Patent: Feb. 21, 2006

(54) DEVICE FOR PROJECTING A STEREO COLOR IMAGE

(75) Inventor: Helmut Jorke, Gerstetten (DE)

(73) Assignee: DaimlerChrysler AG, (DE)

(*) Notice: Subject to any disclaimer, the term of this patent is extended or adjusted under 35 U.S.C. 154(b) by 0 days.

(21) Appl. No.: 10/790,389

(22) Filed: Mar. 1, 2004

(65) Prior Publication Data

US 2004/0165150 A1    Aug. 26, 2004

Related U.S. Application Data

(62) Division of application No. 09/744,634, filed as application No. PCT/DE00/01666 on May 24, 2000, now Pat. No. 6,698,890.

(30) Foreign Application Priority Data

May 26, 1999    (DE)    ................................ 199 24 167

(51) Int. Cl.
    G03B 21/00    (2006.01)
    G03B 21/20    (2006.01)
(52) U.S. Cl. ............................ 353/7; 353/31; 353/102
(58) Field of Classification Search .................... 353/7, 353/8, 31; 359/462, 464
    See application file for complete search history.

(56) References Cited

U.S. PATENT DOCUMENTS

| | | | |
|---|---|---|---|
| 3,846,810 A | 11/1974 | Ihms | 35/12 |
| 5,121,983 A | 6/1992 | Lee | 353/20 |
| 5,537,476 A | 7/1996 | Coteus et al. | 345/634 |
| 5,879,065 A * | 3/1999 | Shirochi et al. | 353/8 |
| 5,886,816 A * | 3/1999 | Faris | 359/464 |
| 6,412,949 B1 | 7/2002 | Halldorsson | 353/8 |

* cited by examiner

Primary Examiner—Christopher Mahoney
(74) Attorney, Agent, or Firm—Pendorf & Cutliff (57) ABSTRACT

A device for projecting a color image upon a screen, including color image recording and color image reproduction with an enhanced color reproduction trueness in comparison to conventional processes. In the device two images are recorded in parallel, which separately detect the shorter and the longer wavelength parts of the individual principle color spectral regions. In image reproduction six primary valences are produced, which respectively comprise the image information of the shorter and the longer wavelength parts of each of the individual principle color spectral regions. In an alternative embodiment the device produces a full color, stereoscopic image reproduction, in which the three primary valences of the respective shorter wave part encode a stereoscopic half image and the three primary valences of the respective longer wavelength part encode the other stereoscopic half image.

11 Claims, 7 Drawing Sheets

DEVICE FOR PROJECTING A STEREO COLOR IMAGE

CROSS REFERENCE TO RELATED APPLICATION

This application is a Divisional of U.S. application Ser. No. 09/744,634 filed Jan. 26, 2001, which issued U.S. Pat. No. 6,698,890 on Mar. 2, 2004 which is a 371 of PCT/DE00/01666, filed May 24, 2000.

BACKGROUND OF THE INVENTION

1. Field of the Invention

The invention concerns a device for projecting a color image onto a screen, the device enabling color image recording and a color image reproduction with greater fidelity than possible with existing techniques. In an alternative embodiment, the device and the therewith employed process provides for full color stereoscopic image reproduction.

2. Description of the Related Art

In existing devices and processes for image recording in full color, the color information is detected by the separate recording of the respective spectral regions which correspond to the primary colors red, green and blue. In the subsequent image reproduction, the primary color partial pictures are combined into a full color image. A device of this type is known for example from WO WO98/49837.

Fundamentally, both in photochemical processes as well as in electronic processes, photoelectric transformers are involved in reproducing visual contents in color.

The length and the breadth of the mentioned spectral regions is largely dictated by the spectral sensitivity of the color receptors in the human eye. Typical values for both image recording as well as image reproduction lie in the wavelengths of

| | |
|---|---|
| spectral region blue | 430–480 nm |
| spectral region green | 500–550 nm |
| spectral region red | 600–650 nm |

Figure 1:
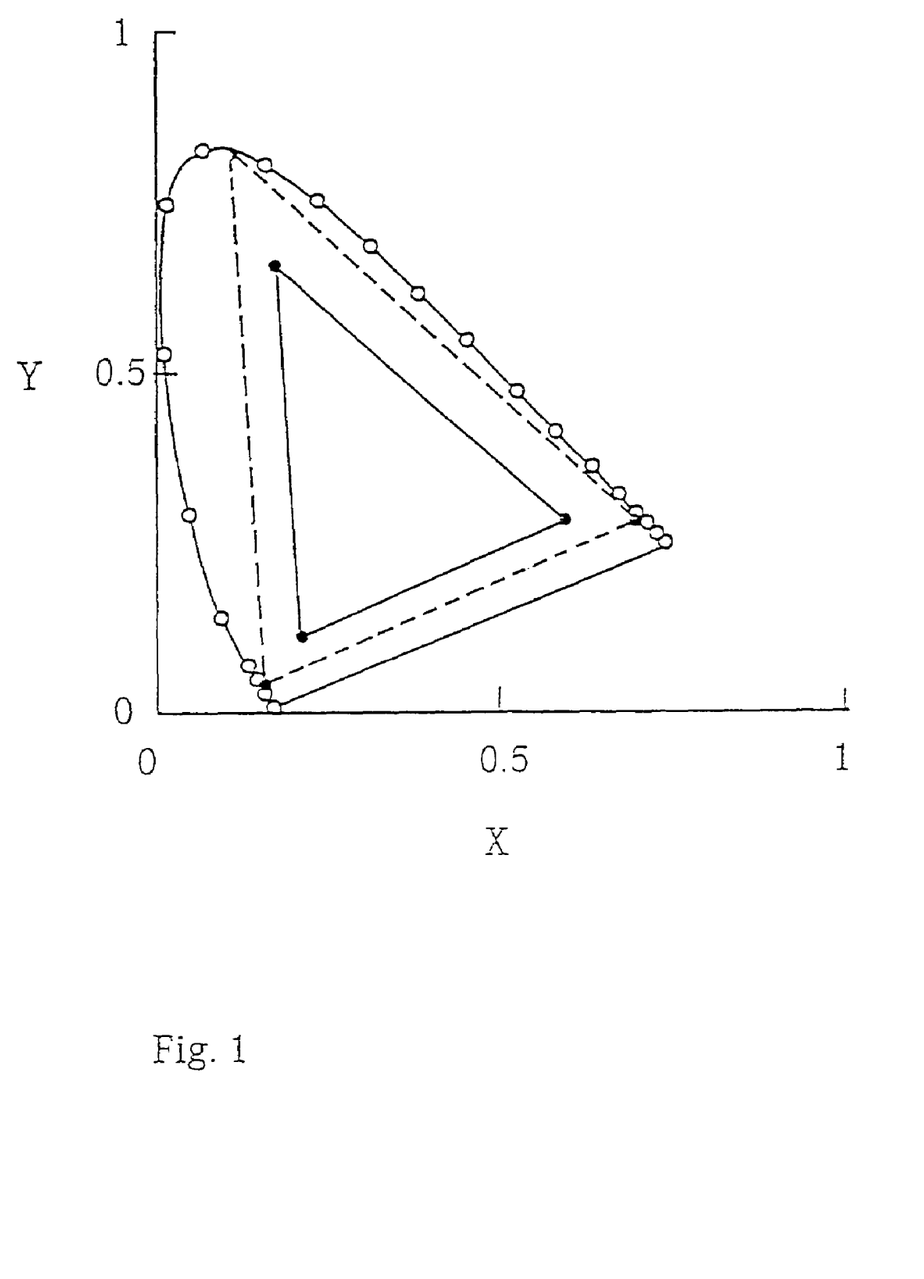
FIG. 1 is a standard color chart or (x,y)-chromaticity diagram wherein the principle colors form a triangle.

Each of these spectral regions can, via its color coordinates, be assigned a point on the standard color chart ((x, y)-chromaticity diagram) according to DIN 6164 (Mutze et al., ABC of Optics, published by Dausien, Hanau, 1972). The totality of all of these principle colors defined in this manner—the primary valences (reference stimulus) (see U.S. Pat. No. 4,409,614, incorporated herein by reference)—form a triangle in the standard color chart, as shown in FIG. 1 (continuous line). By an additive color mixing of the basic colors, each color can be represented within this triangle. Colors outside of this triangle cannot be represented. In particular, spectrally pure colors with their characteristic high color saturation—these lying on the outlying peripheral curve, the spectral color chart curve—are not reproducible.

One possibility for enlarging the representable color space is comprised in the selection of primary valences with narrower spectral ranges for image reproduction. In the extreme case the primary valences (primary colors) are finally spectrally pure and lie on the spectral color curve, as shown in FIG. 1 (dashed line). However the price for the thus achieved enlargement of the color space, for example in projection systems which use broad band emitting temperature radiators (bodies that deliver radiant heat, whose frequency (color) depends on the temperature, commonly used as wide-band strong sources of light) as projection lamps, is a substantial loss in image intensity. This becomes more distinct with the narrowing of the bandwidth of the base colors, since out of the entire emission spectrum only correspondingly small emission ranges are utilized.

If on the other hand one employs spectrally pure light sources, such as for example lasers, then this disadvantage does not occur. However, such systems are very complex and expensive. Besides this, the enlarging of the color space does not necessarily result in increased color reproduction fidelity. Rather, calculations must be made on the enlarged color reproduction side as well as on the recording side. Otherwise, there could result false colors which must be corrected using suitable color transformers. The later however results again in a reduction in the size of the color space.

SUMMARY OF THE INVENTION

The invention is thus concerned with the task of providing a device for projection of a color image, which makes it possible not only to produce an enlarged color space, but rather also to reproduce it, wherein on the recording side the calculation is carried out relative to the reproduction side enlarged color space, wherein there is no substantial loss or penalty in image brightness, wherein the emitted light of the projection lamp is utilized in an efficient manner and wherein expensive spectrally pure light sources are not required.

It has been found that an alternative embodiment of the device can be employed for recording and reproducing three dimensional images. The device offers the advantage, that with few manipulative steps it is possible to alternate between the mode "image recording and reproducing with enhanced color reproduction faithfulness" and the mode "three dimensional recording and reproduction".

By the use of the device, a process for recording and reproducing color images is realized, in which during image recording of the recording object (target) two color images are recorded in parallel, wherein for the image reproduction a projection process is employed, wherein light from a single projection lamp is divided into multiple partial light bundles via a first dichroic mirror with triple band pass characteristic. The three transmission ranges B1, G1, R1 of the first dichroic mirror lie within the wavelength range for a dominant excitation of the blue, green and red receptors in the human eye. One of the transmitted partial light bundles is directed through a color image modulator, which contains the image information from the one recorded color image. Another mirrored partial light bundle is directed through a further color image modulator, which obtains the color image information from the other recorded color image. The two partial light bundles are, after their modulation, again reunited into one light bundle via a second dichroic mirror with triple band pass characteristic. The second dichroic mirror exhibits three transparent or transmissive ranges B2, G2 and R2, which are within the wavelength range for a dominant excitation of the blue, green and red receptors in the human eye and which lie outside the transmission ranges B1, G1, R1 of the first dichroic mirror. Beam recombination occurs in the manner, that the partial light bundle transmitted through the first dichroic mirror is reflected at the second dichroic mirror.

The two color images are recorded in such a manner, that light from the object being recorded is first split preferably by a dichroic mirror with three transmissive ranges B1, G1, R1. The transmitted partial light bundle serves for recording the one color image. The reflected partial light bundle serves for recording the other color image. The two color images are recorded by a stereo camera. The dichroic mirror with the transmission ranges B1, G1, R1 is preferably integrated in a beam splitter which is provided as an enclosed construction component in front of the lenses of the stereo camera. For image reproduction the observer preferably wears a pair of glasses, which have in front of one eye an interference filter with transmission ranges B1, G1, R1 and in front of the other eye an interference filter with the transmission ranges B2, G2, R2. Thereby the left eye exclusively receives the color image recorded with the left camera lens and the right eye exclusively color image recorded with the right camera lens, whereby a stereoscopic vision with a particularly good color fidelity and saturation is produced.

DETAILED DESCRIPTION OF THE INVENTION

The invention will be described in the following on the basis of two illustrative embodiments which reference to the schematic drawings.

Figure 2:
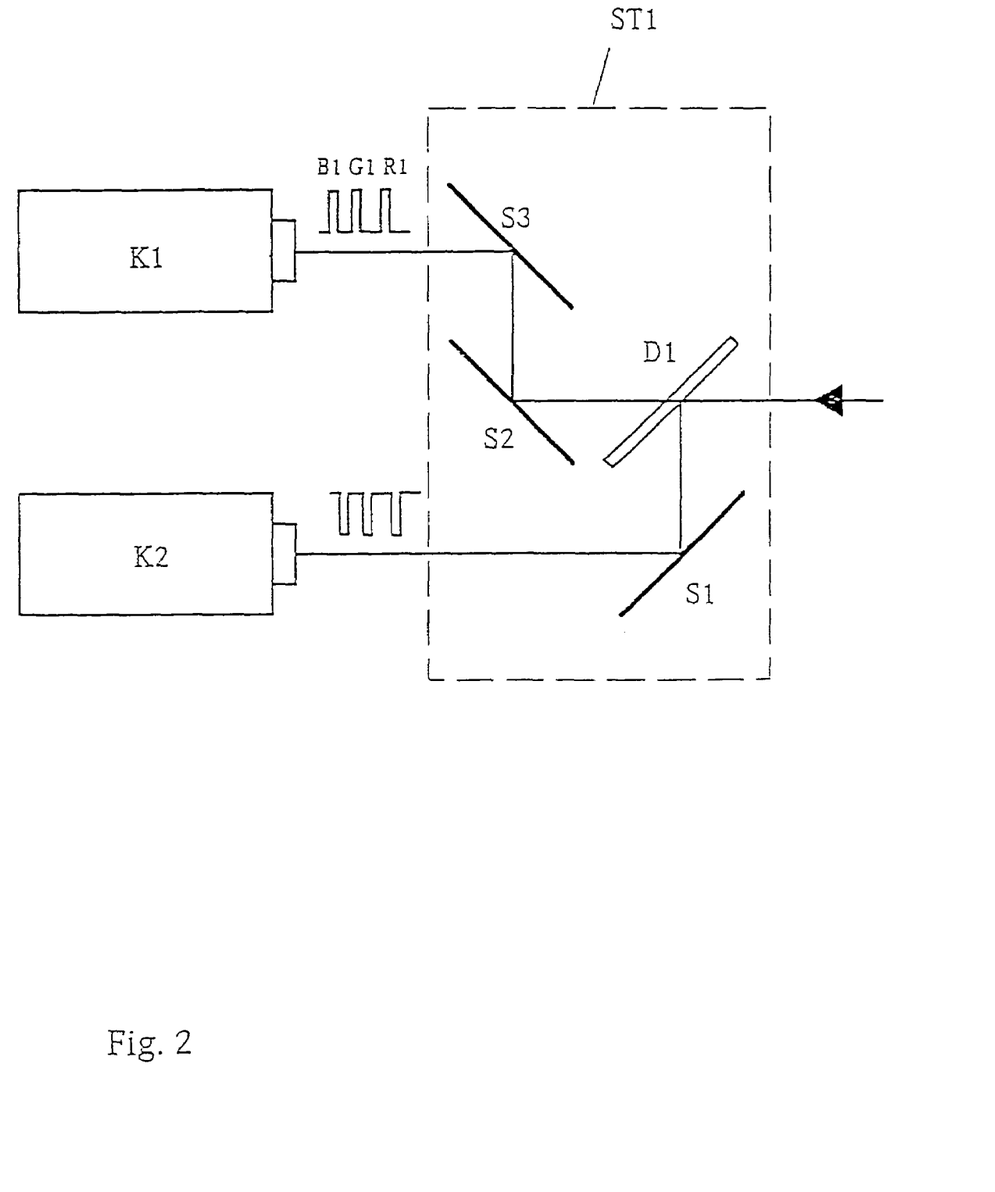
FIG. 2 shows an image recording system.
Figure 3:
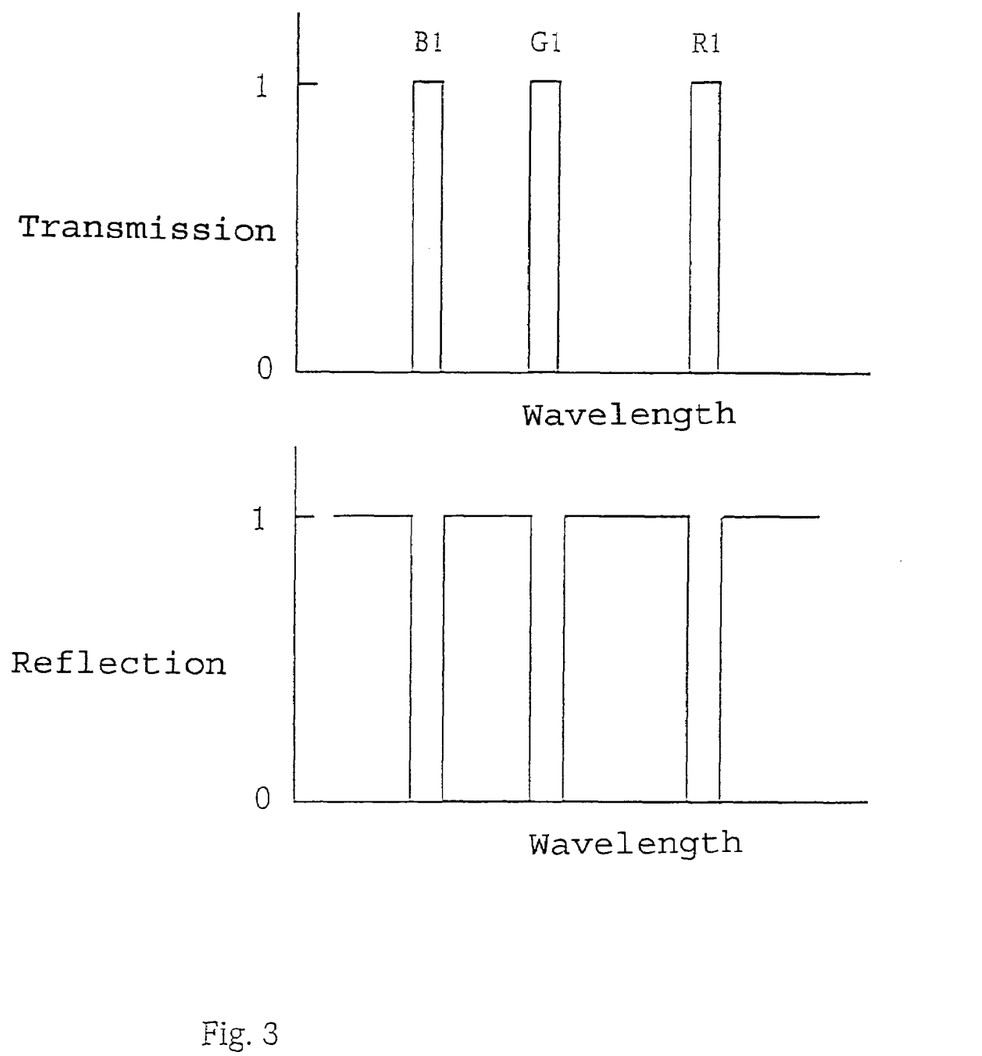
FIG. 3 shows the transmission and reflection characteristics of the dichroic mirror D1 of the image recording system of FIG. 2.

FIG. 2 shows an image recording system, comprised of a camera K1 and an camera K2 with a beam splitter ST1 placed before it, which is a single construction component comprised of the mirrors S1, S2, S3 and a dichroic mirror D1 with a transmission and reflection characteristic as shown in FIG. 3. The light from the object being recorded impinging upon D1 is spectrally separated into two partial light bundles. The partial light bundle passing through mirrors S2 and S3 into camera K1 is comprised spectrally of three components B1, G1, R1, which for example cover the wavelength ranges

| | |
|---|---|
| B1 | 435–455 nm |
| G1 | 510–530 nm |
| R1 | 600–620 nm |

The partial light bundle entering into camera K2 via mirror S1 is comprised of the spectrum complimentary to light bundle 1.

Figure 4:
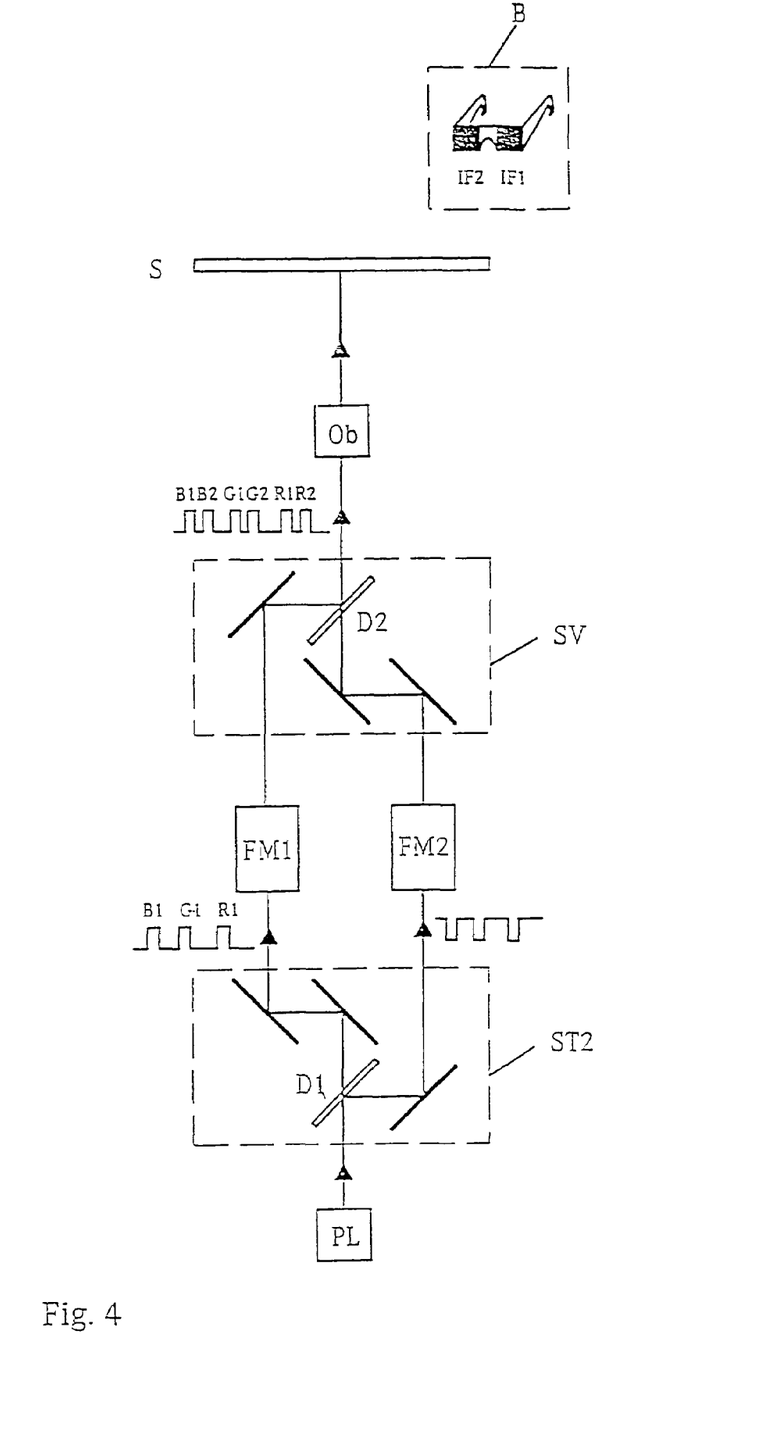
FIG. 4 shows a device for projection of a color image
Figure 5:
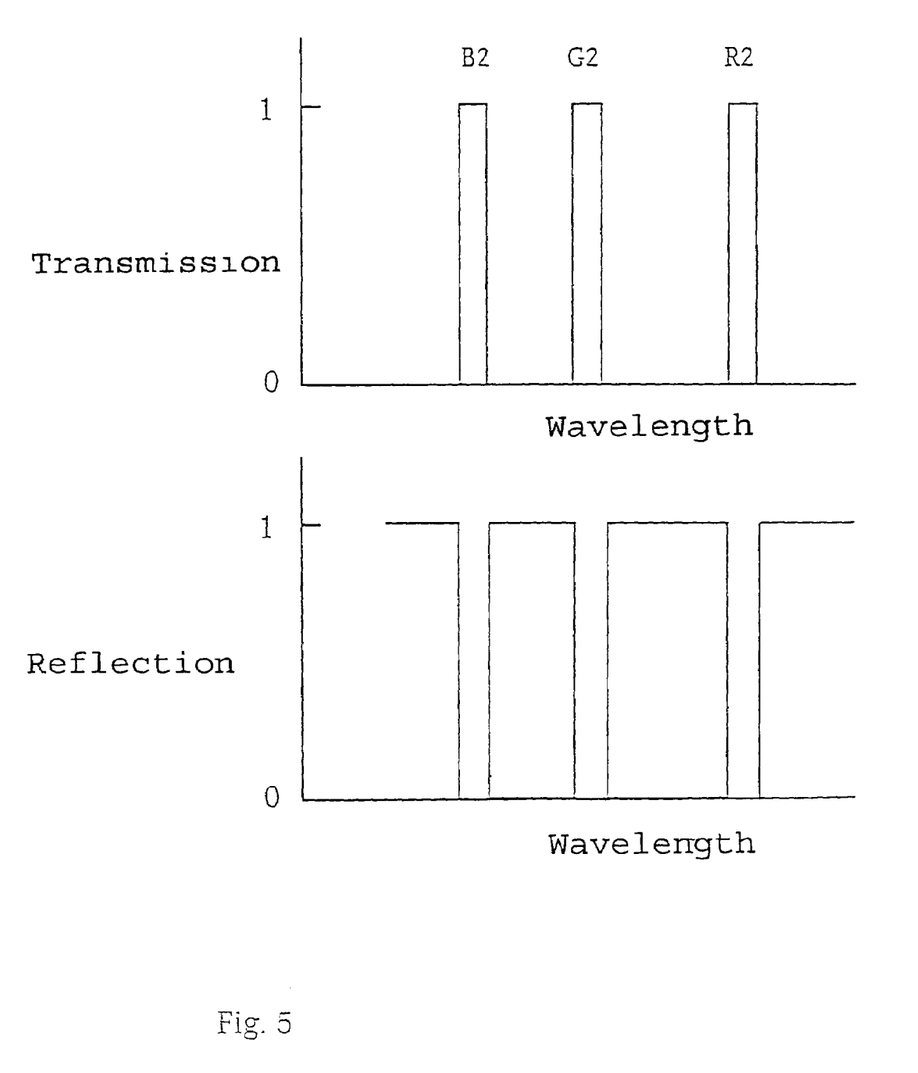
FIG. 5 shows the transmission and reflection characteristic of the dichroic mirror D2 contained in beam integrator SV of the device of FIG. 4.

FIG. 4 shows a device for projection of a color image (also called image reproduction system), comprised of a projection lamp PL with a temperature radiator, which emits a broad band spectrum, a beam splitter ST2 with basically the same design as beam splitter ST1, two color image modulators FM1 and FM2, which operate for example on the basis of light valve technology, a beam integrator SV with basically the same design as ST1, a projection lens system Ob and a display screen S. The internal construction of color image modulators constitutes a part of the state of the art (G. Derra et al., "UHP-Lamps: Light Sources of Extreme High Light Intensity for the Projection TV", Phys. Letters, 54 (1998, No. 9). The beam integrator SV brings the partial light bundles back together after their modulation in the color image modulators FM1 and FM2. Therein the color image modulator FM1 obtains the image information from camera K1 and the color image modulator FM2 the image information from camera K2. The dichroic mirror D2 contained in beam integrator SV has a transmission and reflection characteristic or relationship as shown in FIG. 5. By means of this transmission and reflection relationship it is achieved that the light bundle emitted from beam integrator SV is comprised spectrally of six ranges. Besides the spectral ranges B1, G1, R1 there is also within its spectrum the components B2, G2, R2, which can cover for example the following wavelength ranges

| | |
|---|---|
| B2 | 460–480 nm |
| G2 | 535–555 nm |
| R2 | 625–645 nm |

Figure 6:
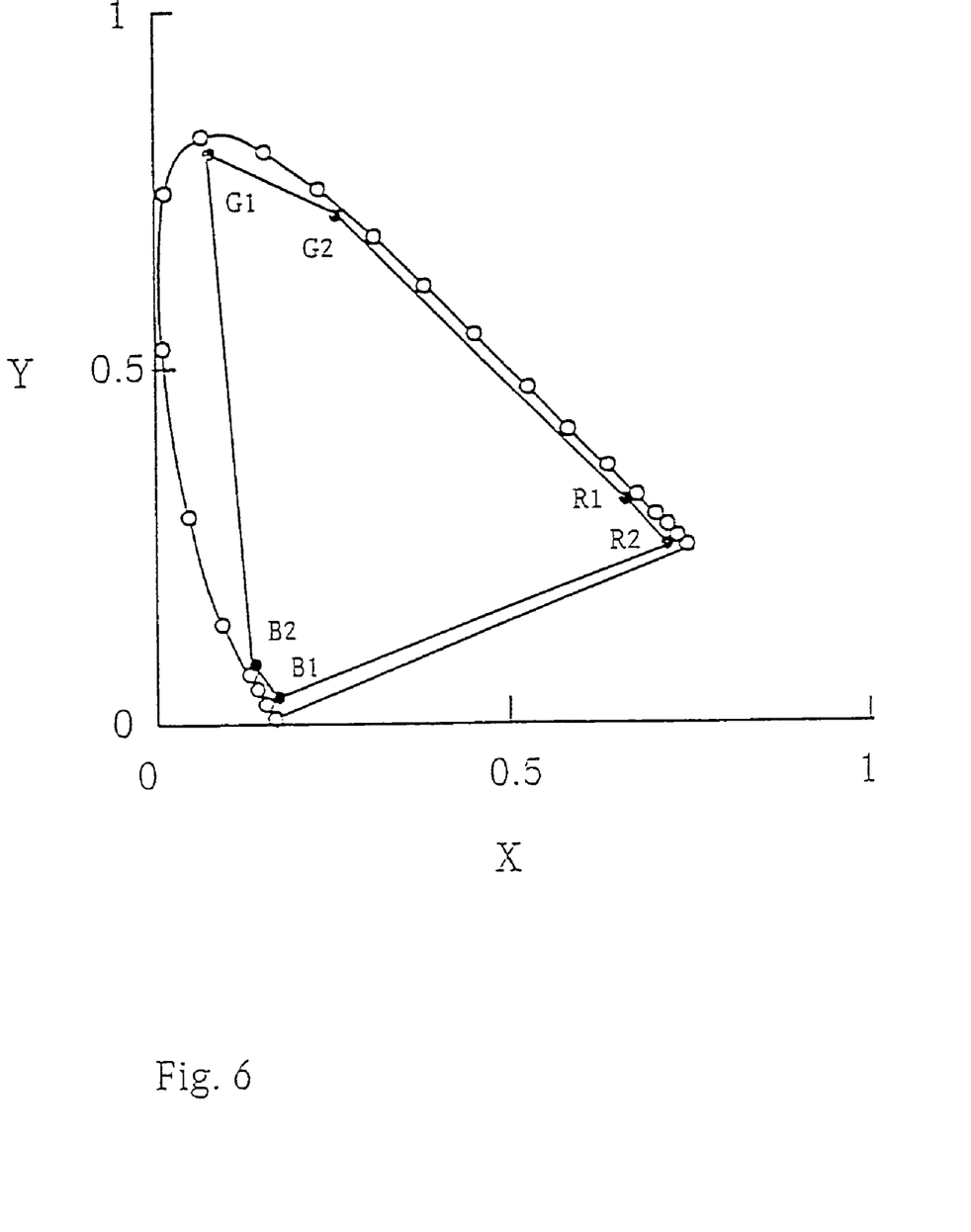
FIG. 6 shows the larger color space that can be represented using the device of FIG. 4.

The image recording and image reproducing process which can be carried out using this device employs, instead of three—as is conventional in existing processes—six primary valences, which corresponds to the spectral ranges B1, B2, G1, G2, R1, R2. Thereby a larger color space can be represented, as shown in FIG. 6. By the spectral partitioning already in the image recording by means of the beam splitter ST2, it is achieved that a larger color space is not only representable by the described process, but rather also is significantly reproducible. For clarification or explanation of this factual relationship it is assumed, that spectrally pure light with λ=450 nm enters into the image recording system (=color modulators FM1, FM2), as shown in FIG. 2. On the basis of the beam splitting in ST1 only the blue spectral range is addressed in camera K1. Accordingly only the light valve for the spectral range blue opens in color modulator FM1 of the image reproducing system according to FIG. 4. After beam integration in the beam integrator SV there is in the spectrum only the primary valences B1, which produces on the display screen S an almost saturated color imprint of the color blue. In the conventional processes with a primary valence blue in the wavelength region 430–480 nm the reproduced color saturation and therewith the true color reproduction would be clearly lower.

Figure 7A:
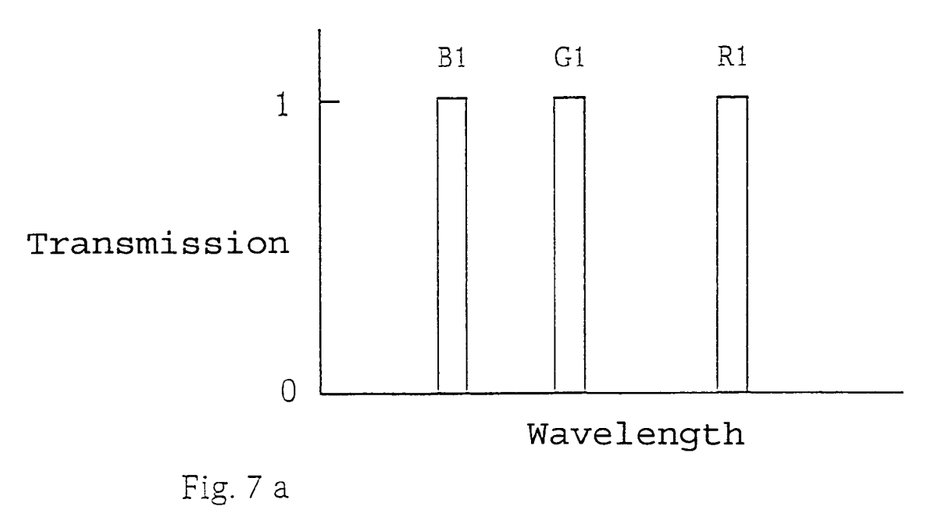
FIGS. 7a and 7b show the transmission characteristics of left and right interference filters (IF1) and (IF2) for a pair of glasses (B) through which an observer can obtain the impression of a three dimensional image.
Figure 7B:
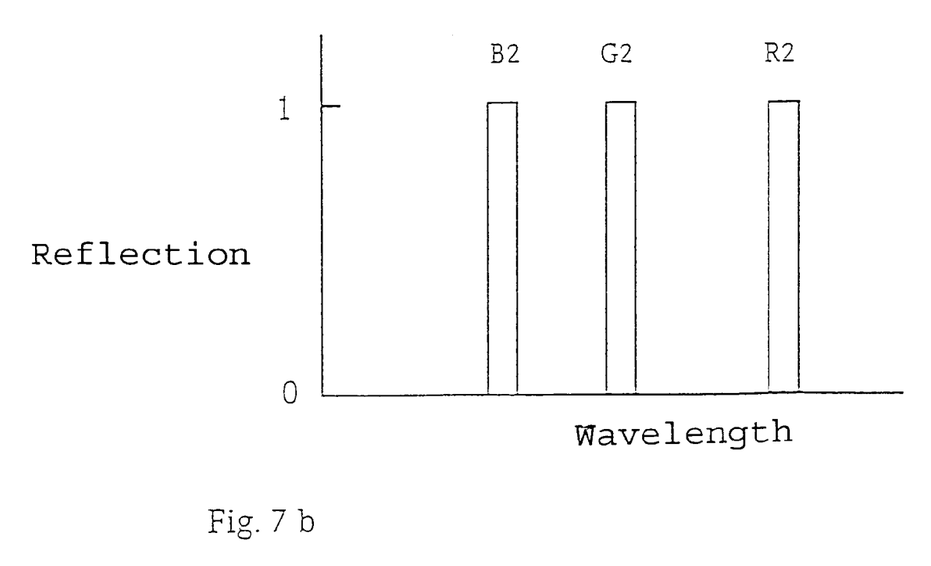

In an alternative embodiment the beam splitter ST1 is omitted as a construction component. Camera K1 and camera K2 form a stereoscopic image pair. In image reproduction according to FIG. 4 the image information of the left half image recorded by camera K1 is contained in the primary valences B1, G1, R1. The image information of the right image half is contained in the primary valences B2, G2, R2. With the aid of a supplemental pair of glasses B on the observer, which contain the interference filters IF1 and IF2 with a transmission relationship as shown in FIG. 7a (IF1) and FIG. 7b (IF2), it is achieved that the left eye of the observer receives only the left image half and the right eye only the right image half. Thereby the observer has the impression of a three dimensional image.

It is possible to alternate between the mode of operation of image recording with enhanced color reproducibility—as described in illustrative embodiment 1—and the mode of operation of three dimensional image recording—as described in illustrative embodiment 2—in simple manner by removal or introduction of the beam splitter ST1, ST2 as a self contained or enclosed construction component. A further possibility is comprised in simply pivoting mirror S1 and S2 out of the beam path.

The invention claimed is:

1. A device for projecting a stereo color image upon a screen (S) including
   a projection lamp (PL) for emission of a radiation spectrum,
   a beam splitter (ST2) for separation of the radiation spectrum emitted from the projection lamp into a first partial light bundle (B1, G1, R1) and a second partial light bundle (B2, G2, R2) complimentary to the first part light bundle (B1, G1, R1), wherein the wavelength ranges for B2, G2 and R2 are within the wavelength range for a dominant excitation of the blue, green and red receptors in the human eye and lie outside the wavelength ranges B1, G1, R1,
   first and second color image modulators (FM1, FM2), wherein said first color image modulator (FM1) produces a half image comprised of said first partial light bundle (B1, G1, R1) and said second image modulator (FM2) produces a half image comprised of said second partial light bundle (B2, G2, R2),
   a beam integrator (SV) provided subsequent to the color image modulators (FM1, FM2) for reuniting the first partial light bundle (D1, G1, R1) with the second partial light bundle (B2, G2, R2), and
   a lens system (Ob) for output of the therefrom resulting color image.

2. A device according to claim 1, wherein the first partial light bundle is comprised of three first narrow transmission ranges (B1, G1, R1) and the second partial light bundle is comprised of three second narrow transmission ranges (B2, G2, R2) complimentary to the first transmission ranges, wherein the transmission ranges (B1, G1, R1, B2, G2, R2) lie within the wavelength ranges of the blue, green and red receptors of the human eye.

3. A device according to claim 1, wherein the beam splitter (ST2) includes at least one splitter mirror.

4. A device according to claim 1, wherein the beam integrator (SV) includes at least one integrator mirror.

5. A device according to claim 1, further including a pair of glasses (B) with interference filters (IF1, IF2) which provide different transmission characteristics for the left eye and the right eye, which produce for the left eye a half image with the first transmission range (B1, G1, R1) and for the right eye a further half image with the second transmission range (B2, G2, R2) for stereoscopic vision, wherein the wavelength ranges for B2, G2 and R2 are within the wavelength range for a dominant excitation of the blue, green and red receptors in the human eye and lie outside the wavelength ranges B1, G1, R1.

6. A device as in claim 1, wherein
   the beam splitter (ST2) includes a splitter dichroic mirror (D1) with triple band pass characteristic, the beam integrator (SV) includes an integrator dichroic mirror (D2) with triple band characteristic, and
   beam recombination occurs in the manner, that the partial light bundle transmitted through the splitter dichroic mirror is reflected at the integrator dichroic mirror.

7. A device as in claim 1, wherein
   the beam splitter (ST2) includes a splitter dichroic mirror (D1) with triple band pass characteristic,
   the beam integrator (SV) includes an integrator dichroic mirror (D2) with triple band characteristic,
   said first and second half images are reproduced from a recording medium on which is recorded a first half-image comprised of light in three transmission ranges B1, G1, R1 within the wavelength range for a dominant excitation of the blue, green and red receptors in the human eye, and a second half-image comprised of light in three transmissive ranges B2, G2 and R2, which are within the wavelength range for a dominant excitation of the blue, green and red receptors in the human eye and which lie outside the transmission ranges B1, G1, R1 of the splitter dichroic mirror.

8. A device for projecting a stereo color image upon a screen (S) including
   a projection lamp (PL) for emission of a radiation spectrum,
   a beam splitter (ST2) for separation of the radiation spectrum emitted from the projection lamp into a first partial light bundle (D1, G1, R1) and a second partial light bundle (B2, G2, R2) complimentary to the first part light bundle (D1, G1, R1),
   first and second color image modulators (FM1, FM2), wherein said first color image modulator (FM1) produces a half image comprised of said first partial light bundle (B1, G1, R1) and said second image modulator (FM2) produces a half image comprised of said second partial light bundle (B2, G2, R2),
   a beam integrator (SV) provided subsequent to the color image modulators (FM1, FM2) for reuniting the first partial light bundle (D1, G1, R1) with the second partial light bundle (B2, G2, R2), and
   a lens system (Ob) for output of the therefrom resulting color image,
   wherein the beam splitter (ST2) includes a splitter dichroic mirror (D1) with triple band pass characteristic.

9. A device for projecting a stereo color image upon a screen (S) including
   a projection lamp (PL) for emission of a radiation spectrum,
   a beam splitter (ST2) for separation of the radiation spectrum emitted from the projection lamp into a first partial light bundle (D1, G1, R1) and a second partial light bundle (B2, G2, R2) complimentary to the first part light bundle (D1, G1, R1),
   first and second color image modulators (FM1, FM2), wherein said first color image modulator (FM1) produces a half image comprised of said first partial light bundle (D1, G1, R1) and said second image modulator (FM2) produces a half image comprised of said second partial light bundle (B2, G2, R2),
   a beam integrator (SV) provided subsequent to the color image modulators (FM1, FM2) for reuniting the first partial light bundle (B1, G1, R1) with the second partial light bundle (B2, G2, R2), and
   a lens system (Ob) for output of the therefrom resulting color image,
   wherein the beam integrator (SV) includes an integrator dichroic mirror (D2) with triple band characteristic.

10. A device for projecting a stereo color image upon a screen (S) including
   a projection lamp (PL) for emission of a radiation spectrum,
   a beam splitter (ST2) for separation of the radiation spectrum emitted from the projection lamp into a first partial light bundle (B1, G1, R1) and a second partial light bundle (B2, G2, R2) complimentary to the first part light bundle (B1, G1, R1),
   first and second color image modulators (FM1, FM2), wherein said first color image modulator (FM1) produces a half image comprised of said first partial light bundle (B1, G1, R1) and said second image modulator (FM2) produces a half image comprised of said second partial light bundle (B2, G2, R2),
   a beam integrator (SV) provided subsequent to the color image modulators (FM1, FM2) for reuniting the first partial light bundle (B1, G1, R1) with the second partial light bundle (B2, G2, R2), and
   a lens system (Ob) for output of the therefrom resulting color image, wherein
   the beam splitter (ST2) includes a splitter dichroic mirror (D2) with triple band pass characteristic,
   the beam integrator (SV) includes an integrator dichroic mirror (D2) with triple band characteristic,
   the three transmission ranges B1, G1, R1 of the splitter dichroic mirror lie within the wavelength range for a dominant excitation of the blue, green and red receptors in the human eye, and
   the integrator dichroic mirror exhibits three transparent or transmissive ranges B2, G2 and R2, which are within the wavelength range for a dominant excitation of the blue, green and red receptors in the human eye and which lie outside the transmission ranges B1, G1, R1 of the splitter dichroic mirror.

11. A device for projecting a stereo color image upon a screen (S) including
   a projection lamp (PL) for emission of a radiation spectrum,
   a beam splitter (ST2) for separation of the radiation spectrum emitted from the projection lamp into a first partial light bundle (B1, G1, R1) and a second partial light bundle (B2, G2, R2) complimentary to the first part light bundle (D1, G1, R1)
   first and second color image modulators (FM1, FM2), wherein said first color image modulator (FM1) produces a half image comprised of said first partial light bundle (B1, G1, R1) and said second image modulator (FM2) produces a half image comprised of said second partial light bundle (B2, G2, R2),
   a beam integrator (SV) provided subsequent to the color image modulators (FM1, FM2) for reuniting the first partial light bundle (B1, G1, R1) with the second partial light bundle (B2, G2, R2), and
   a lens system (Ob) for output of the therefrom resulting color image,
   wherein the beam splitter spectrally separates the light emitted from the projection lamp into a first partial light bundle (B1, G1, R1) and a second partial light bundle (B2, G2, R2) complimentary to the first part light bundle (Bi, G1, R1), wherein
   one of said partial light bundles has a component within the wavelength range 435–455 nm and the other has a component within the wavelength range 460–480 nm,
   one of said partial light bundles has a component within the wavelength range 510–530 nm and the other has a component within the wavelength range 535–555 nm, and
   one of said partial light bundles has a component within the wavelength range 600–620 nm and the other has a component within the wavelength range 625–645 nm.

* * * * *